(12) United States Patent
Pineda et al.

(10) Patent No.: US 11,592,895 B1
(45) Date of Patent: Feb. 28, 2023

(54) SYSTEMS AND METHODS FOR IMPROVING POWER EFFICIENCY

(71) Applicant: EPIRUS, INC., Hawthorne, CA (US)

(72) Inventors: Christopher Antonio Pineda, Hawthorne, CA (US); Jeffery Jay Logan, Torrance, CA (US); Harry Bourne Marr, Jr., Manhattan Beach, CA (US); Grant Lovely Verstandig, McLean, VA (US)

(73) Assignee: EPIRUS, INC., Hawthorne, CA (US)

(*) Notice: Subject to any disclaimer, the term of this patent is extended or adjusted under 35 U.S.C. 154(b) by 0 days.

(21) Appl. No.: 17/364,708

(22) Filed: Jun. 30, 2021

(51) Int. Cl.
*G06F 1/26* (2006.01)
*G06F 1/32* (2019.01)
*G06F 1/3296* (2019.01)
*G06F 13/36* (2006.01)
*G06F 1/28* (2006.01)
*G05F 1/46* (2006.01)

(52) U.S. Cl.
CPC ............ *G06F 1/3296* (2013.01); *G05F 1/46* (2013.01); *G06F 1/28* (2013.01); *G06F 13/36* (2013.01)

(58) Field of Classification Search
CPC .................................. G06F 1/3296; G06F 1/28
See application file for complete search history.

(56) References Cited

U.S. PATENT DOCUMENTS

| | | | | | |
|---|---|---|---|---|---|
| 7,598,947 | B2* | 10/2009 | Lehomme | ............... | H04N 17/04 345/204 |
| 11,110,538 | B2* | 9/2021 | Kowaleski | ........... | B23K 9/1006 |
| 2004/0146101 | A1* | 7/2004 | Pearce | ..................... | H03K 7/08 375/238 |
| 2009/0070505 | A1* | 3/2009 | Krueger | .................. | H04L 12/66 710/107 |
| 2012/0229104 | A1* | 9/2012 | Pierson | .................. | G06F 1/3234 323/234 |
| 2014/0098705 | A1* | 4/2014 | Chow | ..................... | H04L 41/14 370/254 |
| 2015/0283334 | A1* | 10/2015 | Marx | .................... | A61M 5/345 604/533 |
| 2016/0031524 | A1* | 2/2016 | Gerhardt | ................ | G08G 1/166 701/22 |

(Continued)

OTHER PUBLICATIONS

Electronic Design, The Basics of PMBus Design (2013), https://www.electronicdesign.com/power-management/article/21795818/the-basics-of-pmbus-design.

(Continued)

*Primary Examiner* — Mohammed H Rehman
(74) *Attorney, Agent, or Firm* — Knobbe, Martens, Olson & Bear LLP

(57) ABSTRACT

Systems and methods for improving power efficiency of electronic systems are disclosed. An intelligent voltage regulator module (VRM) can self-regulate the output power provided to one or more components of an electronic system. For example, output voltage to a component can be increased when more computational power is needed or lowered when appropriate. The intelligent VRM can regulate the output power, for instance, based on one or more of usage or activity of the component. In some cases, the intelligent VRM can independently regulate the output power without input from a host device or override one or more output power parameters. Adjustment of the output power can be performed using machine learning (ML).

21 Claims, 8 Drawing Sheets

(56) References Cited

U.S. PATENT DOCUMENTS

2016/0357245 A1\* 12/2016 Heo .......................... G06F 1/26
2020/0272220 A1\* 8/2020 Mosalikanti ............ H03L 7/093
2021/0034421 A1\* 2/2021 Gu ........................ G06F 1/3206

OTHER PUBLICATIONS

WikiChip, Voltage Regulator Module (VRM) (2020), https://en.wikichip.org/wiki/voltage_regulator_module#Multi-phase.
International Rectifier, PMBus Brochure, https://www.infineon.com/dgdl/fs12008.pdf?fileId=5546d462533600a40153568d00532a9a (retrieved on Jun. 8, 2021).

\* cited by examiner

SYSTEMS AND METHODS FOR IMPROVING POWER EFFICIENCY

TECHNICAL FIELD

Disclosed are systems and methods for improving power efficiency of electronic systems, such as computing systems.

BACKGROUND

A voltage regulator module (VRM) is an electronic circuit that regulates and down steps voltage from the input (such as, a system power rail) to the output (such as, voltage provided to one or more integrated circuits). In a computing system, a VRM typically converts 12 V, 5 V, or 3.3 direct current (DC) power signal provided by the power supply into DC signal at a lower operating voltage of the one or more integrated circuits (such as, 0.8 V, 1 V, or 1.2 V). A VRM is typically implemented as a switching regulator. However, existing computing system architectures utilizing one or more VRMs can be inefficient.

SUMMARY

Disclosed herein are systems and methods directed to changing electrical voltage, current and/or power provided to components of an electrical system depending on their usage, available power resources and compute load. Computers often have performance loads that are time dependent, application dependent (which applications are being used at that time), data dependent (the application will have a different compute load depending on the input and output data), as well as user dependencies (a given user will exhibit different behaviors which will affect the computer load). The systems and methods are configured to regulate voltage, current and/or power levels based on these different dependencies to optimize power usage. Implementations of voltage regulator modules (VRMs) described herein can raise and lower voltages at much finer levels and much faster than existing VRMs. This advantageously opens up new slices of time to provide greater power savings than existing systems. Computing chips have properties such as dynamic voltage and frequency scaling (DVFS) such that voltage and required clock speed can be dynamically lowered for lower compute loads and raised for higher compute loads based on these dependencies.

A system configured regulate power in a computing system can include electronic circuitry configured to communicate with first and second components of the computing system on a single bus, such as a single power management bus (PMBus). The PMBus can branch out to the first and second components having individual addresses for communicating on the PMBus. The electronic circuitry can be configured to monitor a first power consumption of the first component and a second power consumption of the second component. The electronic circuitry can be configured to determine a first adjustment of a power supplied by a power supply based on the first power consumption and supply the power adjusted by the first adjustment to the first component. The electronic circuitry can be configured to determine a second adjustment of the power supplied by the power supply based on the second power consumption and supply the power adjusted by the second adjustment to the second component. The first and second adjustments can optimize power efficiency of the computing system.

A system configured regulate power in a computing system can include electronic circuitry configured to communicate with a component of the computing system on a common bus, such as a common power management bus (PMBus). The PMBus can be connected to the component and at least one other component of the computing system. The component and the at least one other component can have separate addresses for communicating on the PMBus. The electronic circuitry can be configured to monitor a power consumption of the component. The electronic circuitry can be configured to determine an adjustment of a power supplied by a power supply based on the power consumption and supply the power adjusted by the adjustment to the component. The adjustment of power can optimize power efficiency of the computing system.

An integrated circuit can be configured to communicate with a plurality of devices. The integrated circuit can be configured to monitor a usage or activity of the plurality of devices. The integrated circuit can be configured to alter a state of one of more of the plurality of devices based on the usage or activity.

An integrated circuit can include a power monitoring and control system configured to be in communication with a plurality of devices. The power monitoring and control system can be configured to monitor an activity level of at least one of the plurality of devices. The power monitoring and control system can be configured to, based on the activity level, adjust power provided to the at least one of the plurality of devices.

A computing system can include a plurality of devices. The computing system can include a power monitoring and control system in communication with the plurality of devices. The power monitoring and control system can be configured to monitor activity of at least one of the plurality of devices. The power monitoring and control system can be configured to adjust driving voltage or power provided to the at least one of the plurality of devices.

Disclosed are one or more methods of regulating power using any of the systems of any of the preceding paragraphs and/or any of the systems disclosed herein. Disclosed are one or more computer readable media storing instruction that, when executed by any of the systems of any of the preceding paragraphs and/or any of the systems disclosed herein, cause regulation of power.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

Computing systems may utilize separate VRMs for various electronics components (sometimes referred to as components), such as a central processing unit (CPU), memory, and chipset in a general purpose computer. These components can be positioned on a motherboard (or mainboard) of the computing system. The VRMs can be controlled by the CPU or another controller (such as, a microcontroller or a field programmable gate array (FPGA)) that controls power supplied to one or more components of the system using a bus that supports an open or proprietary interface. For example, the CPU or another controller can set the voltage output of the VRMs. Open bus interfaces can be, for instance, a system management bus (SMBus) or a power management bus (PMBus). Proprietary bus interface can be, for example, a serial voltage identification definition (SVID). The VRMs can report status information (such as, current, voltage, or temperature) and error information to the CPU or another controller.

Systems and methods for improving power efficiency of electronic systems are disclosed. Electronic systems can include one or more of a desktop computing system, a mobile computing system, an autonomous vehicle, an electronic warfare system, an artificial reality (AR) or virtual reality (VR) device, or the like. An intelligent VRM can self-regulate the output power (such as, voltage or current) provided to one or more components of an electronic system. For example, the intelligent VRM can increase the output voltage to a component when more computational power is needed or lowered when appropriate. The intelligent VRM can regulate the output power, for instance, based on one or more of usage or activity of the component. In some cases, the intelligent VRM can independently regulate the output power without input from the CPU or another controller or override one or more output power parameters. The intelligent VRM can regulate output power for two or more components. The intelligent VRM can be implemented in hardware. Adjustment of the output power can be performed using machine learning (ML), which can be executed by one or more controllers or processors of the intelligent VRM. Without any loss of generality, the intelligent VRM is also referred to herein as a power controller or a smart power controller.

In some cases, in addition to regulating the power independently, the intelligent VRM can communicate with the CPU or another controller. The intelligent VRM can adjust the output power in response to receiving one or more commands from the CPU or another controller. However, unlike existing computing systems, the intelligent VRM can bypass (or override) the CPU or controller and adjust power independently, for instance, in response to determining that a component may require higher or lower output power. Overriding a parameter can include adjusting the parameter or skipping the parameter.

Intelligent Power Regulation

Figure 1:
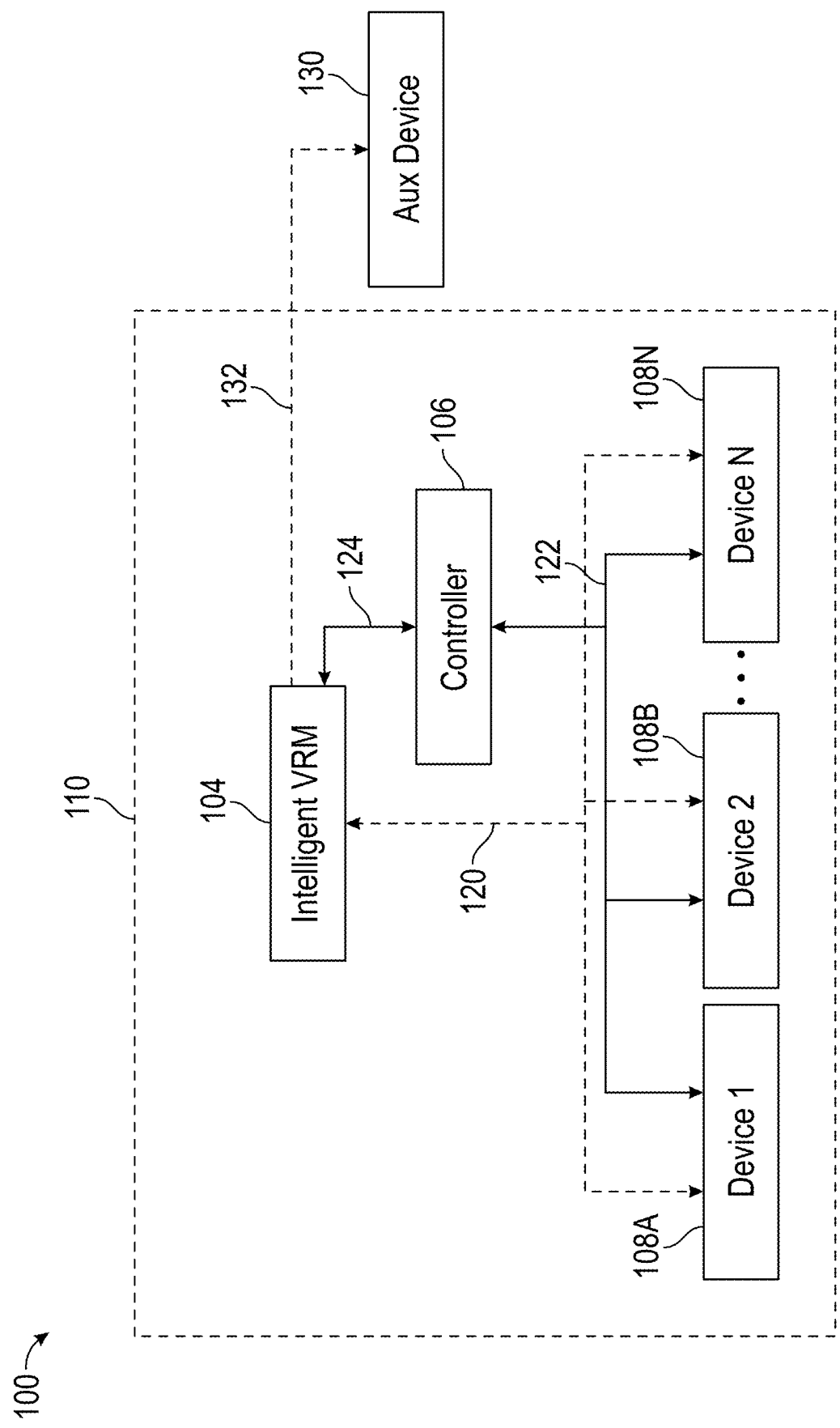
FIG. 1 illustrates an intelligent VRM architecture.

FIG. 1 illustrates a block diagram 100 of an intelligent VRM architecture. The block diagram 100 can illustrate components a computing system, such as a general purpose computer. A controller 106 can communicate with one or more devices or components 108A, 108B, . . . , 108N via one or more buses 122 (such as, SVID). The controller 106 can regulate power provided to the one or more components 108A, 108B, . . . , 108N, which can include one or more of a CPU, memory (which can be volatile, such as DRAM, or non-volatile, such as flash memory), chipset, graphics processing unit (GPU), input/output (I/O) controller, or the like. The controller 106 can act as a host device for regulating power (for instance, a host device for one or more buses 120 or 122). The controller 106 can utilize an intelligent VRM 104 to regulate power (such as, voltage or current) supplied to the one or more components 108A, 108B, . . . , 108N. The intelligent VRM 104 can be connected to the one or more components 108A, 108B, . . . , 108N via one or more buses 120, which can be a SMBus, PMBus, or SVID. As is illustrated by separate arrows in FIG. 1, the intelligent VRM 104 can be connected to each of or more components 108A, 108B, . . . , 108N via a separate connection of the bus 120. In some implementations, the separate connection can be a replacement of the bus 120. The controller 106 and the intelligent VRM 104 can be connected via a bus 124, which can be a SMBus, PMBus, or SVID. The controller 106, intelligent VRM 104, one or more components 108A, 108B, . . . , 108N, one or more buses 120 and 122, and the bus 124 can be positioned on a motherboard 110.

The computing system can include one or more auxiliary or peripheral components, which can be connected to the motherboard 110 through different types of interfaces (such as, ports or slots). For example, a graphics card can be connected via a peripheral component interconnect express (PCIe) slot. As illustrated in FIG. 1, the intelligent VRM 104 can regulate power supplied to a peripheral component 130 (or multiple components 130), which may not be positioned on the motherboard 110. The intelligent VRM 104 can be connected to the peripheral component 130 via a bus 132 (which can be similar to the one or more buses 120 or be a different bus). Continuing with the above example, the peripheral component 130 can be a graphics card connected via a PCIe slot. The intelligent VRM 104 can adjust the output power provided to the graphics card through the system bus of the PCIe slot, which can interface with a PMBus. The intelligent VRM 104 can interface with other peripheral devices through dedicated connections that are different from the PMBus.

The intelligent VRM 104 can regulate the output power provided to the one or more components 108A, 108B, . . . , 108N or the one or more peripheral components 130 in response to receiving one or more commands or instructions received from the controller 106 via the bus 124. In such first mode of operation, the intelligent VRM can regulate the output power under the direction of or in cooperation with the controller 106. In a second mode of operation, the intelligent VRM 104 can bypass or override the controller 106 and independently regulate the output power provided to the one or more components 108A, 108B, 108N or the one or more peripheral components 130. In some cases, the intelligent VRM 104 can execute one or more ML models to estimate when higher power (such as, voltage or current) is required and automatically increase the output power or reduce the output power when appropriate. The VRM 104 can execute the one or more ML models in the first and/or second mode of operation.

For example, the intelligent VRM 104 can determine one or more usage patterns and, based on the one or more usage patterns, determine the power requirement. The intelligent VRM 104 can regulate the output power to match preferences of a user of the computing system. For instance, a first user of a computing system may utilize one or more programs or applications that require significant graphics processing (such as, a computer-aided design program, a computer graphics program, a video game, or the like), and the intelligent VRM 104 can increase the power output to the GPU or graphics card when the first user is operating the computing system. As another example, the intelligent VRM 104 can use an ML model to determine an activity level of a component and, based on the activity level, determine the power requirement. As yet another example, the intelligent VRM 104 can lower the power output to one or more components at night or on the weekend (for instance, because the activity level may be low). The power output can be lowered to a minimum voltage value for a component to cause the component to transition to an energy saving mode (such as, hibernate or sleep) or even turned off.

An ML model can be a predictive model, such as a random forest, generalized linear model (GLM), gradient boosted model, K-means, or prophet. In some implementations, artificial neural networks can be employed by the intelligent VRM 104 for predictive modeling and adaptive control of the one or more components 108A, 108B, ..., 108N or the one or more peripheral components 130. The intelligent VRM 104 can poll the one or more components 108A, 108B, ..., 108N or the one or more peripheral components 130 to obtain their status information. The intelligent VRM 104 can obtain other information about one or more of a user operating the computing system, one or more processes being executed by the computing system, date and time, or the like from the CPU or another component of the computing system. One or more of such other information and the status information can be utilized by the ML model to make a prediction about the power requirements of the one or more components 108A, 108B, ..., 108N or the one or more peripheral components 130 and adjust the output power.

The intelligent VRM 104 can regulate the output power provided to the one or more components 108A, 108B, ..., 108N or the one or more peripheral components 130 directly. For example, the intelligent VRM 104 can turn the output power signal on or off, change one or more characteristics of a pulse width modulation (PWM) signal (such as, one or more of an amplitude, period, or duty cycle) that regulates the output power signal (as described below) to adjust the output power signal, change the number of PWM phases, or control the ripple of the output power signal, as described below. The intelligent VRM 104 can regulate the output power indirectly by issuing one or more commands to the controller 106 to perform one or more of the foregoing actions.

Figure 2:
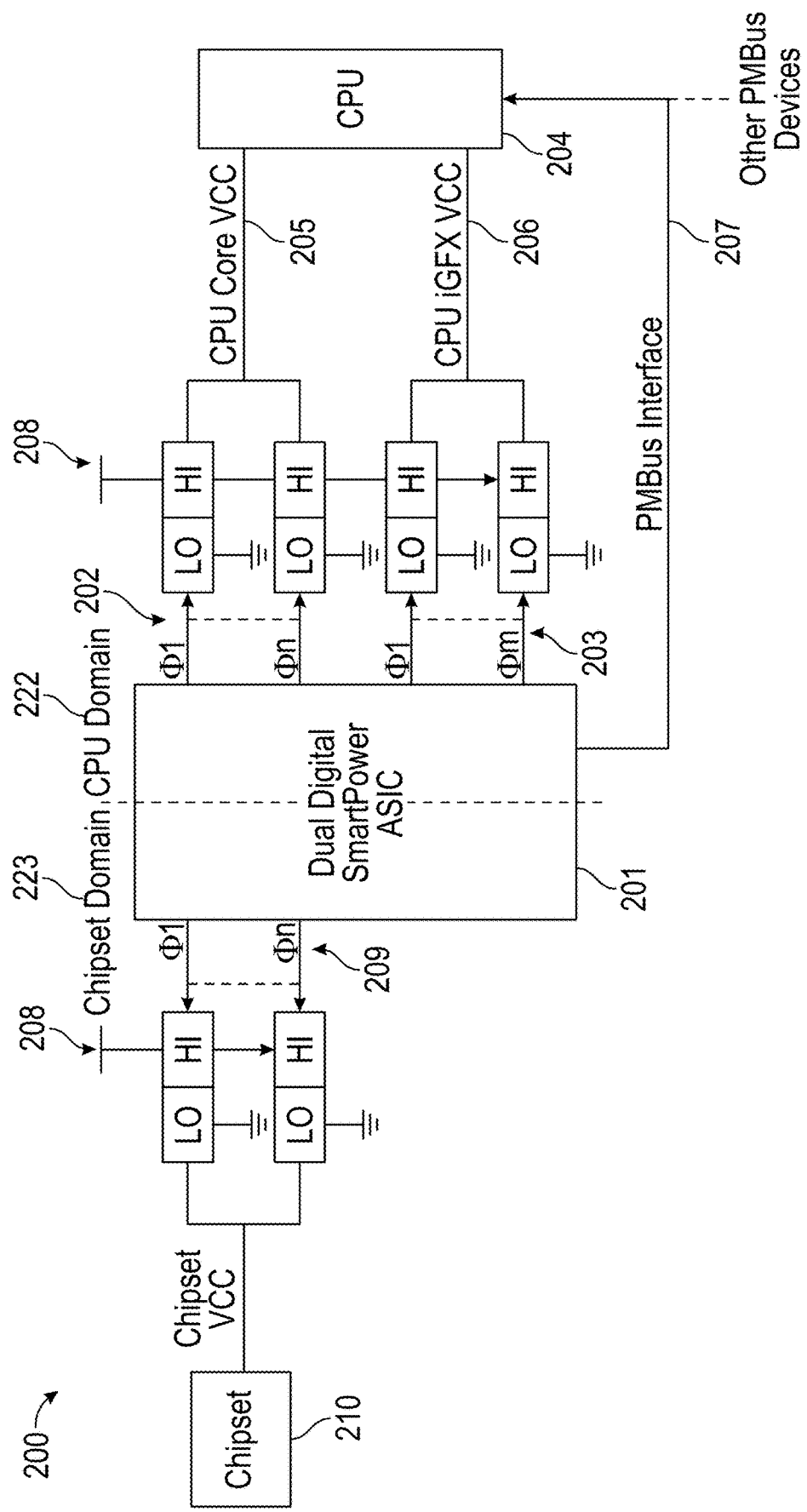
FIGS. 2 and 3 illustrate an intelligent VRM architecture for multiple devices.

FIG. 2 illustrates a block diagram 200 of an intelligent VRM architecture for multiple devices or components. The block diagram 200 illustrates two such components, namely, a CPU 204 and chipset 210. The block diagram 200 can illustrate components a computing system, such as a general purpose computer. In some cases, additional or different components can be included. For instance, the chipset 210 can be replaced with a different component, such as a memory. In some cases, the block diagram 200 can be an implementation of the intelligent VRM architecture of FIG. 1, and the intelligent VRM 201 can be similar to the intelligent VRM 104.

An intelligent VRM 201 can be implemented in hardware, such as an application specific integrated circuit (ASIC) or an FPGA. The intelligent VRM 201 can regulate the output power (such as, voltage or current) of the CPU 204 and chipset 210. The intelligent VRM 201 can be referred to as Dual Device Digital SmartPower (DiSP). The intelligent VRM 201 can generate one or more digital signals for regulating the output power. The one or more digital signals can be one or more PWM signals. The one or more PWM signals can control high-side and low-side drivers 208 (that in turn can control high-side and low-side switches, which can be implemented as transistors) of one or more DC-to-DC power converters (such as, buck converters). The one or more power converters can step down the input voltage (for instance, DC signal provided by a power supply or power source) to a desired level for powering the CPU 204 and chipset 210. In some cases, the CPU 204 can include an integrated GPU, whose power may be regulated separately from the regulation of the CPU power.

The VRM can regulate the output to a constant voltage at a desired level. The high-side and low-side switches of a power converter (such as, a buck converter) can be alternately opened and closed to step down the voltage to the desired level. When a high-side switch is closed, an inductor of the power converter is being charged by the input DC signal (for instance, provided by the power supply). In opposing the increasing current, the inductor will produce opposing voltage across its terminals, which would step down the output voltage. When a low-side switch is closed, the inductor will be discharging. Due to the opposition to the change in the current, a voltage drop across the terminals of the inductor will be produced, which would step down the output voltage.

Figure 8A:
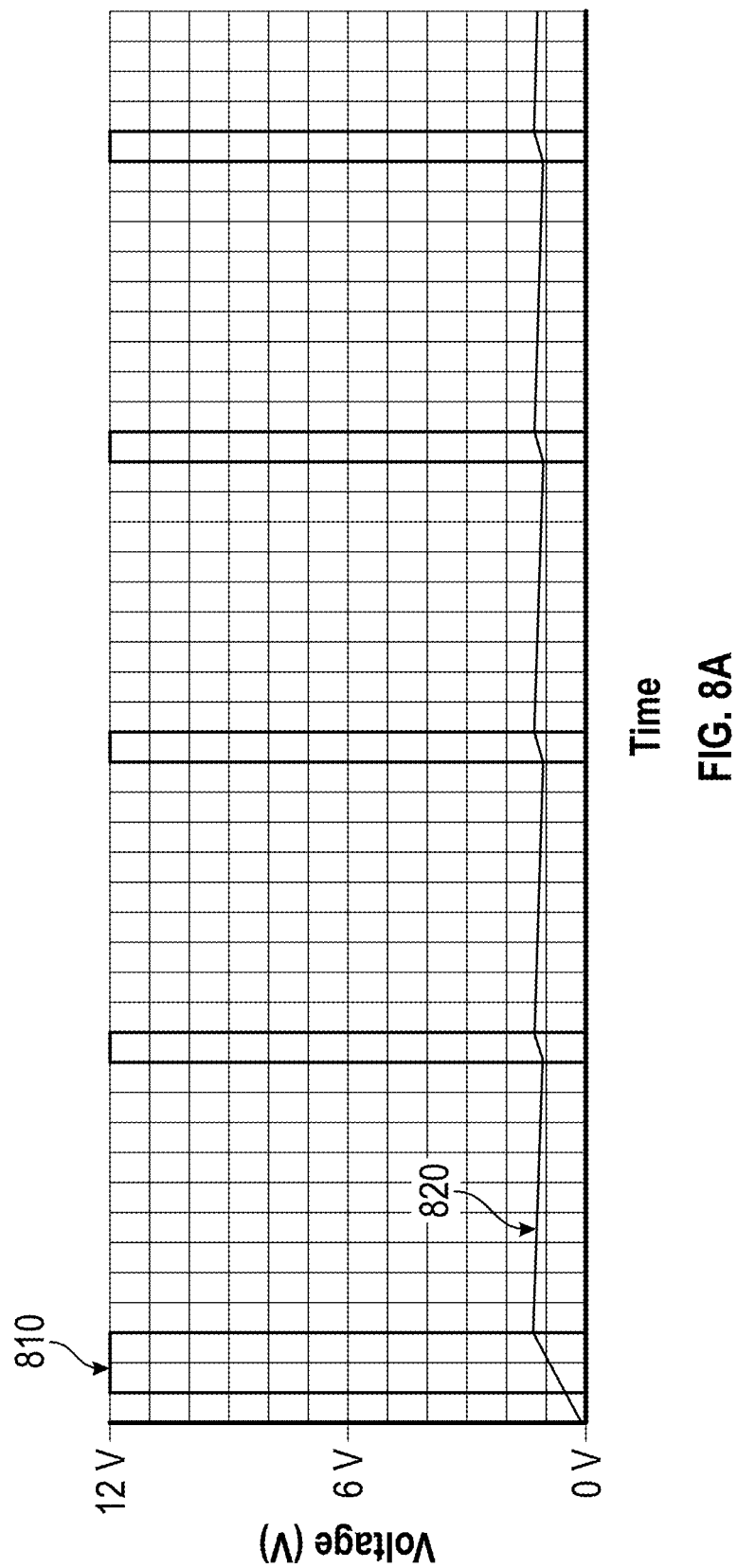
FIG. 8A illustrates a graph for single phase regulation of output voltage.

The cycle of opening and closing the high-side and low-side switches can be controlled using PWM, which can facilitate maintaining the average voltage output by the power converter at the desired level. Through PWM, there can be generated a rectangular pulse wave (or pulse wave) whose pulse width can be modulated to obtain a desired average value of the waveform. The pulse wave can be a digital signal. FIG. 8A illustrates a pulse wave 802 generated using PWM. A duty cycle of the pulse wave can indicate the proportion of "on" time to the period of the pulse wave. For example, a PWM signal at 50% duty cycle can have an average value of one-half of the amplitude of the pulse wave (as the pulse wave is "on" for half of the period).

For example, the input voltage can be 12V (or less or more) and the desired level of the output voltage can be about 1.2V (or less or more). To step down the input voltage from 12V to 1.2V, the duty cycle of the PWM signal should be 10%. This is illustrated in FIG. 8A, which shows a pulse wave 810 generated using PWM and having a duty cycle of 10%. The resulting output voltage 820 is maintained at about 1.2V.

Figure 8B:
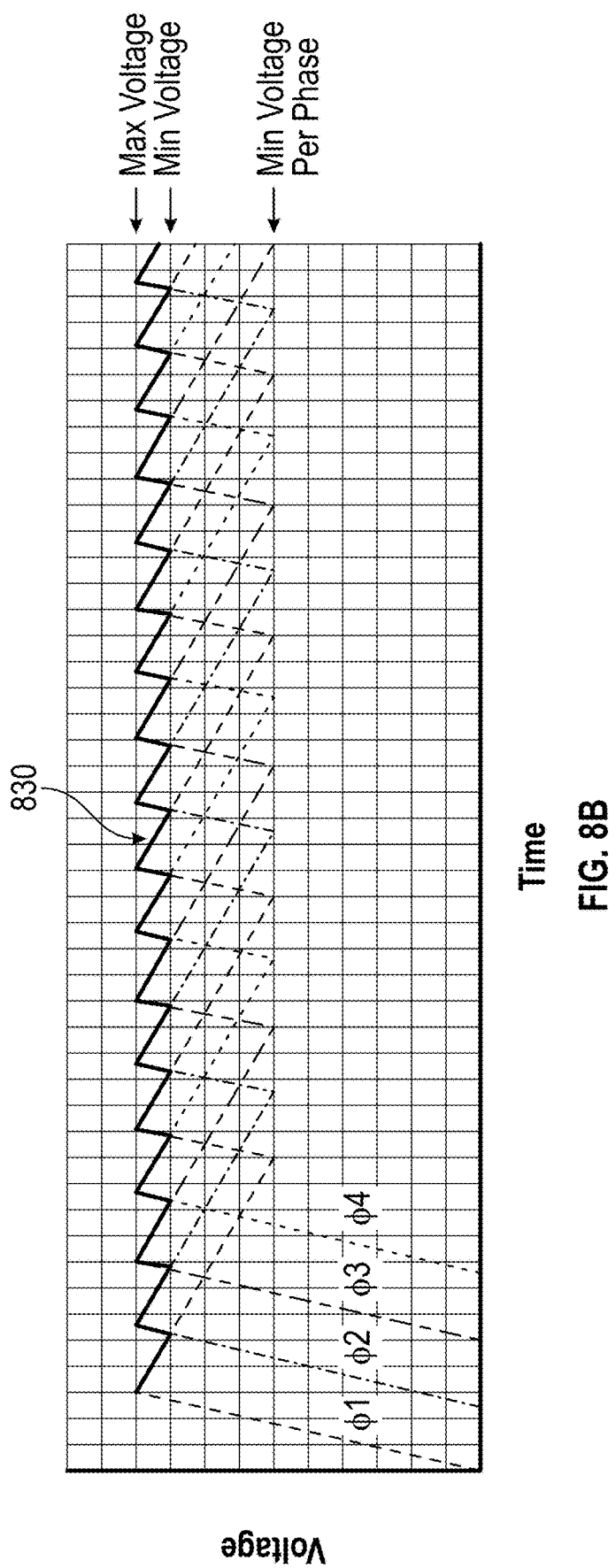
FIG. 8B illustrates a graph for multiphase regulation of output voltage.

The intelligent VRM 201 can be a multiphase VRM and can generate multiphase PWM signals. Each phase of the plurality of phases (which can be connected in parallel) can handle a portion of the total power required by a component whose power is being regulated. Each of the phases can be offset such that, at any given time, only one of the phases has the high-side switch closed, thus charging its inductor. The remaining phases would be discharging. FIG. 8B illustrates output voltage of four-phase VRM with phases $\varphi 1$, $\varphi 2$, $\varphi 3$, and $\varphi 4$ being overlapped at an offset. As one phase begins to drop the output voltage, the next phase takes over. The resulting output voltage 830 is maintained at a stable level with smaller variations in the amplitude (for instance, as compared with the output voltage 820 that may be produced by a single phase VRM).

Due to the opening and closing of the one or more high-side and low-side switches (which may be implemented as transistors, such as MOSFET transistors), an unwanted ripple can be introduced into the output power signal. Using more phases can reduce the ripple (such as, reduce the amplitude of the ripple) due to the distribution of the input current among multiple phases. For example, in a dual phase VRM, each of the phases would receive about half of the total current on average. The ripple can be reduced as a result of one or more of the reduction of current, reduction of noise, or reduction in phase mismatch between the different PWM signals. In some cases, the effect of the reduction may shrink with the addition of more phases. For instance, the reduction of the ripple when going from two phases to four phases may be greater than going from six phases to eight phases.

With reference to FIG. 2, the intelligent VRM 201 can generate multiphase PWM signals (and operate as a multiphase N+M phase VRM). In the CPU domain 222 (which is illustrated on the right side of FIG. 2), the intelligent VRM 201 can output N phases 202 for regulating the output power 205 (such as, voltage) provided to the CPU 204. The intelligent VRM 201 can output M phases 203 for regulating the output power 206 (such as, voltage) provided to the integrated GPU of the CPU 204. The number of phases N or M can be selected based on the desired granularity or precision of the power regulation. For instance, the number of phases can be selected based on the requirements of the CPU 204 or chipset 210 and the amplitude of the ripple that may be tolerated (with the increased number of phases typically causing a reduction in the ripple, as described herein). In some cases, the number of N or M phases can be 4, 6, or 8. In some implementations, the number of N or M phases can be less than 12.

In the chipset domain 223 (which is illustrated on the left side of FIG. 2), the intelligent VRM 201 can output N phases 209 for regulating the output power provided to the chipset 210. In some cases, the number of phases 209 for regulating the output power of the chipset 210 can be different than the number of phases 202 for regulating the output power of the CPU 204. In some cases, the intelligent VRM 201 can generate single phase PWM signals.

The intelligent VRM 201 can be connected with the CPU 204 via a bus 207. As described herein in reference to the bus 124, the bus 207 can be, for instance, a PMBus. The intelligent VRM 201 can communicate with the CPU 204 to obtain one or more parameters for adjusting the output power using one or more ML models, as described herein. The CPU 204 can act as a host device on the bus 207 (such as, a PMBus host device). As described herein, the intelligent VRM 201 can receive one or more commands from the CPU 204 for regulating the output power (such as, setting the level of one or more of output voltage or current). The intelligent VRM 201 can operate in two modes of operation. In a first mode of operation, the intelligent VRM 201 can calculate one or more of the voltages, currents, or power required by the various components informed by data from one or more ML models or inputs received from the CPU 204 and cooperate with the CPU 204 to regulate the output power. In a second mode of operation, the intelligent VRM 201 can independently regulate the output power, for instance, by bypassing the CPU 204. The intelligent VRM 201 can provide and/or receive data to/from the CPU 204. For example, as described herein, the intelligent VRM 201 can provide and/or receive telemetry data to/from the CPU 204, such as status data (for example, current, voltage, or temperature) obtained from one or more components whose power is being regulated (such as, the CPU 204 and chipset 210), error information obtained from the one or more components, or the like. The status data received from the one or more components, including error data in addition to information regarding the activity of the one or more components, can inform the output power regulation (such as, voltage regulation) provided by the intelligent VRM 201.

The intelligent VRM 201 can regulate output power provided to the CPU 204 and chipset 210 over the bus 207 (such as, a PMBus). A common bus 207 can connect the intelligent VRM 201 and the CPU 204 and chipset 210. One or more other components can be connected to the common bus 207. Power provided to such one or more components may be regulated by the intelligent VRM 201, another intelligent VRM (such as, any other intelligent VRM described herein), or a standard VRM. In some cases, the bus 207 can be a single bus for regulating power provided to the components of the computing system.

Advantageously, the architecture illustrated in FIG. 2 can simplify power trees of motherboards by providing a single intelligent VRM 201 to regulate power for multiple components. This can lead to maximizing space on the motherboard while also optimizing power regulation for multiple components.

Figure 3:
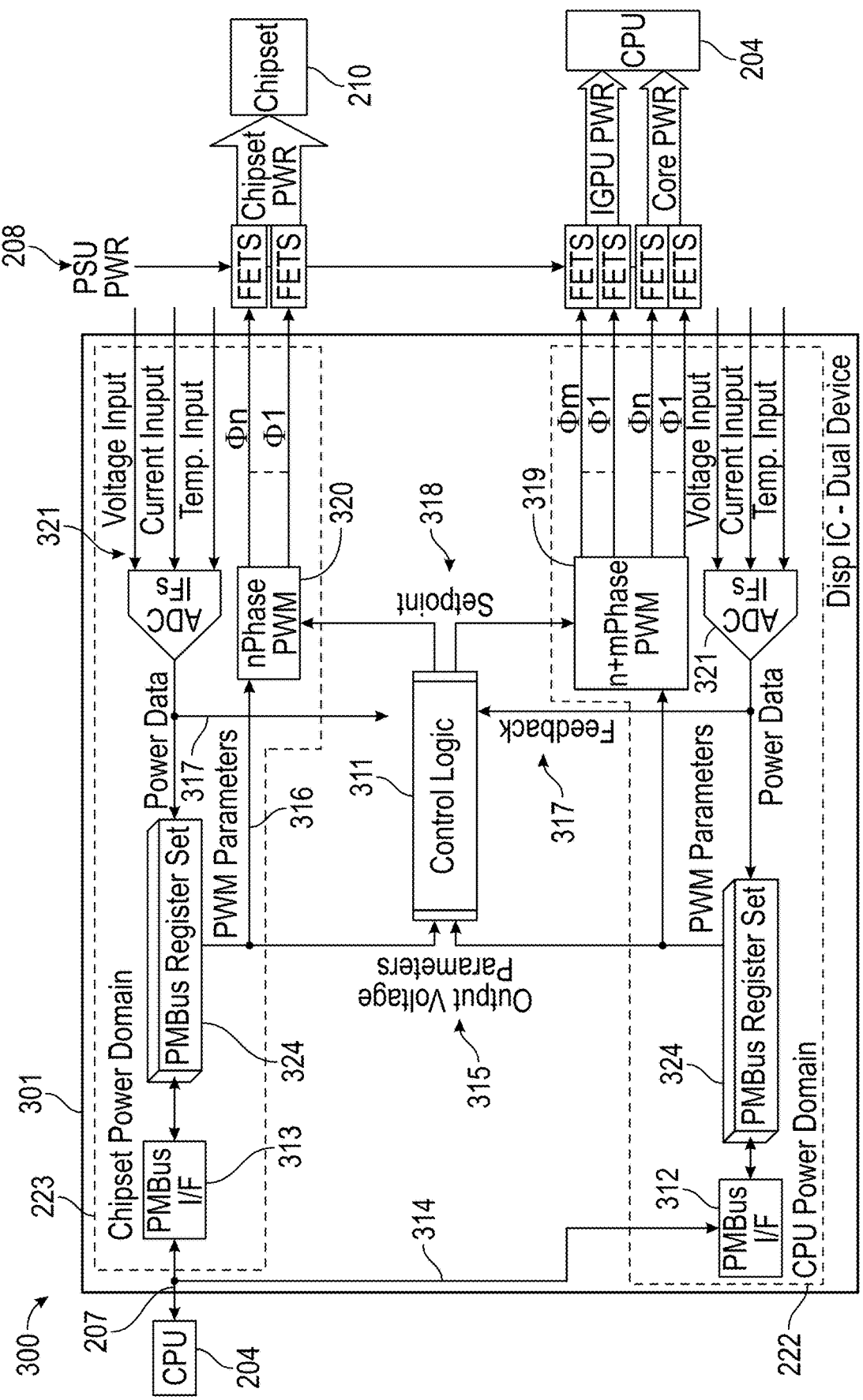

FIG. 3 illustrates a block diagram 300 of an intelligent VRM architecture for multiple devices. The block diagram 300 can be an implementation of the intelligent VRM architecture of FIG. 2, and the intelligent VRM 301 in FIG. 3 can be similar to the intelligent VRM 201. The intelligent VRM 301 can regulate output power provided to the CPU 204 and the chipset 210. The intelligent VRM 301 can regulate the output power by controlling the high-side and low-side drivers 208 (illustrated as controlling field effect transistors (FETs)). The intelligent VRM 301 can include a PWM generator or controller 319 that provides N+M PWM phases to the high-side and low-side drivers 208 for regulating the output power for the CPU 204 and the integrated GPU. The intelligent VRM 301 can include a PWM generator or controller 320 that provides N PWM phases (or a number of phases other than N) to the high-side and low-side drivers 208 for regulating the output power for the chipset 210. The PWM controllers 319 and 320 can be controlled via signals 318 that can specify, for example, the desired duty cycle(s) or pulse width(s) that produce a desired output voltage or power to be provided to one or more of the CPU 204 or chipset 210. For instance, the label "Setpoint" for the signals 318 in FIG. 3 can generally refer to the output voltage provided to one or more of the CPU 204 or chipset 210. Control logic 311 (which can be referred to as SmartPower control logic) can generate the signals 318. As described herein, the control logic 311 can generate the signals 318 based on the one or more commands from the CPU 204 received over the bus 207 (such as, a PMBus) or independently regulate the output power, for example, by executing one or more ML models.

The CPU 204 can act as a PMBus host device. Interfacing with the host device (CPU 204) can be performed through a single PMBus interface that branches out to two internal PMBus interfaces 312 and 313 with different base addresses, as described herein. Advantageously, this can increase expandability with multiple PMBus devices, including single-device intelligent VRMs (as described with reference to FIGS. 4 and 5).

The CPU 204 can provide one or more commands to PMBus interfaces 312 and 313 of the CPU domain 222 (or CPU power domain) and chipset domain 223 (or chipset power domain). The one or more commands can be routed to the PMBus interfaces 312 and 313 through internal connection(s) 314. A PMBus command can include an address (which can be seven bits in size), command type (which can be a byte in size), and optional data (which can be zero, one, or more than one byte in size). Each device connected to a PMBus can be assigned a unique address. For instance, in an architecture utilizing multiple VRMs for controlling multiple components, each VRM can be assigned a unique address. In the intelligent VRM architecture, such as the architecture of FIGS. 2 and 3, a single intelligent VRM 301 can regulate power provided to multiple different components, such as the CPU 204 and chipset 210. To facilitate regulation of output power by the intelligent VRM 301 for multiple components, the CPU domain 222 and chipset domain 223 can be assigned (or can utilize) different base addresses for regulating output power. This can be generalized to assigning (or utilizing) different base addresses for each of the different components whose output power is being regulated by the intelligent VRM 301.

The PMBus interfaces 312 and 313 can each utilize one or more register sets 324 for storing the one or more commands. The one or more register sets 324 can include control registers (such as, for storing one or more commands) and status registers (such as, for storing status data). The one or more register sets 324 can provide one or more output power parameters 315 to the control logic 311. The one or more output power parameters 315 can include, for instance, one or more of minimum voltage, maximum voltage, or nominal voltage. The one or more output power parameters 315 can be input into one or more of the PWM controllers 319 or 320 to calculate a desired duty cycle and/or pulse width. The maximum and minimum voltages can be used to set limits to prevent generating a power signal with excessive or insufficient voltage for one or more of the CPU 204 or chipset 210 either from a direct command or one or more ML models. Providing a power signal with excessive or insufficient voltage can make one or more of the CPU 204 or chipset 210 unrecoverable, in some instances. As described herein, the one or more power parameters 315 can include other information, such as status information about one or more of a user operating the computing system, one or more processes being executed by the computing system, or date and time. These parameters can be provided to one or more ML models being executed by the control logic 311 to regulate the output power of one or more of the CPU 204 or chipset 210 (or, more generally, one or more components being regulated by the intelligent VRM 301). As described herein, such regulation of output power can override one or more output power parameters specified by the CPU 204.

One or more PWM parameters 316 can be output from each of the one or more register sets 324 (such as, from the control registers). For instance, one or more PWM parameters 316 can include the desired duty cycle or the pulse wave, the amplitude of the pulse wave, or the like. As another example, the number of PWM phases can be adjusted dependent on the amplitude of the ripple that may be tolerated by a component whose output power is being regulated (and provided that it would meet the requirement of the CPU 204 or chipset 210).

The intelligent VRM 301 can provide telemetry data to the CPU 204, such as status data (for example, current, voltage, or temperature) obtained from the CPU 204 and chipset 210, error information obtained from the CPU 204 and chipset 210, or the like. Such information can be obtained, for instance, through the PMBus. This information can be converted from the analog representation into a digital representation by analog-to-digital converters (ADCs) 321. Digital representation of such information in the can be stored in the one or more register sets 324 (such as, in the status registers) and provided to the CPU 204 via the PMBus interfaces 312 and 313.

As described herein, the control logic 311 can override the one or more PWM parameters 316. In some cases, the information described in the preceding paragraph can be provided (or fed back) to the control logic 311 for adjusting the regulation of output power to optimize the provision of output power. Such feedback is illustrated by the arrows 317. For instance, one or more PWM parameters 316 can may be adjusted by the control logic 311.

Figure 4:
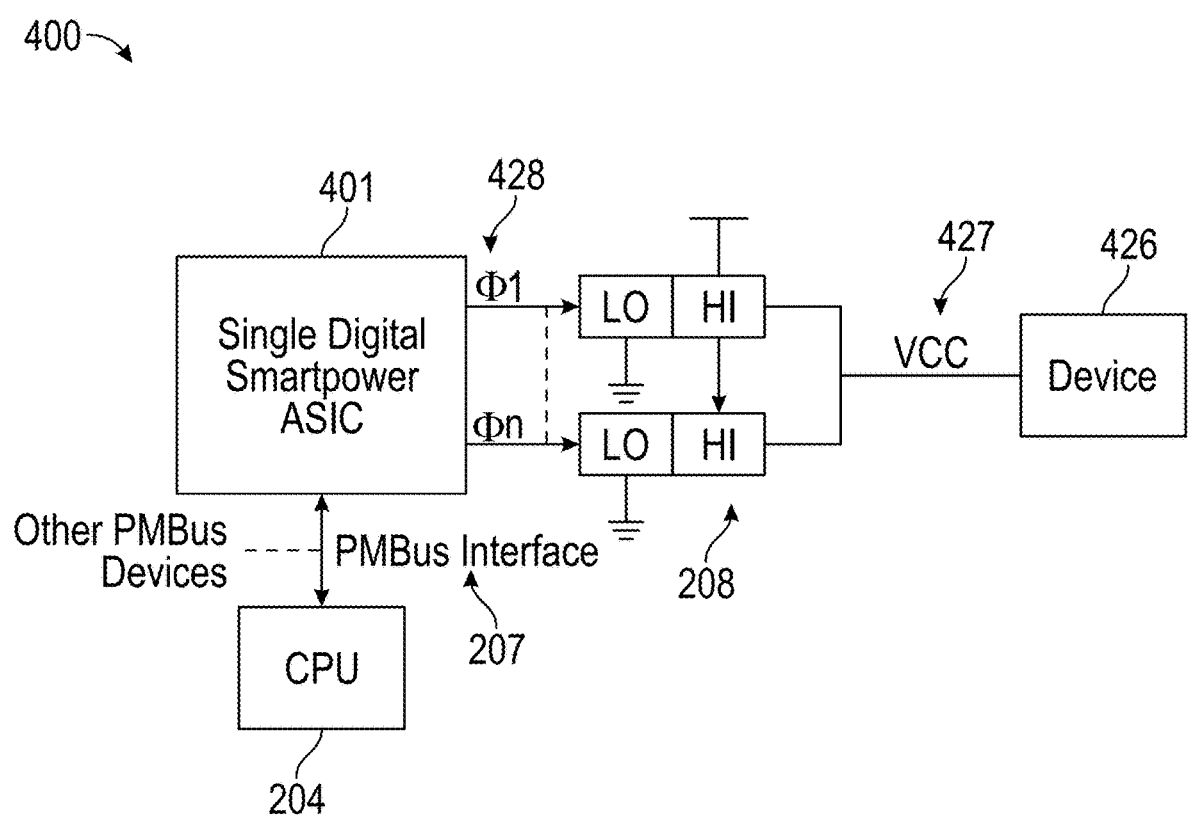
FIGS. 4 and 5 illustrate an intelligent VRM architecture for a single device.

FIG. 4 illustrates a block diagram 400 of an intelligent VRM architecture for a single component. The illustrated architecture can be similar to the architecture of FIG. 2 with the exception that an intelligent VRM 401 regulates output power for a single component 426 (such as, a memory, GPU, or the like). The intelligent VRM 401 can generate a multiphase PWM signal with N phases 428 (or a different number of phases or N+M or different number of phases) that that control high-side and low-side drivers 208 and regulate the output power 427 (such as, voltage) provided to the component 426. As described herein, the intelligent VRM 401 can communicate with the CPU 204 over the bus 207 (such as, a PMBus). The CPU 204 can act as a host device on the bus 207.

The intelligent VRM 401 can be a more general-purpose version of the intelligent VRM 201 that regulates output power for multiple components. The intelligent VRM 401 may be used in any computing system, including being part of a motherboard, peripheral board (such as, a peripheral board of a discrete GPU), or customized digital system.

Figure 5:
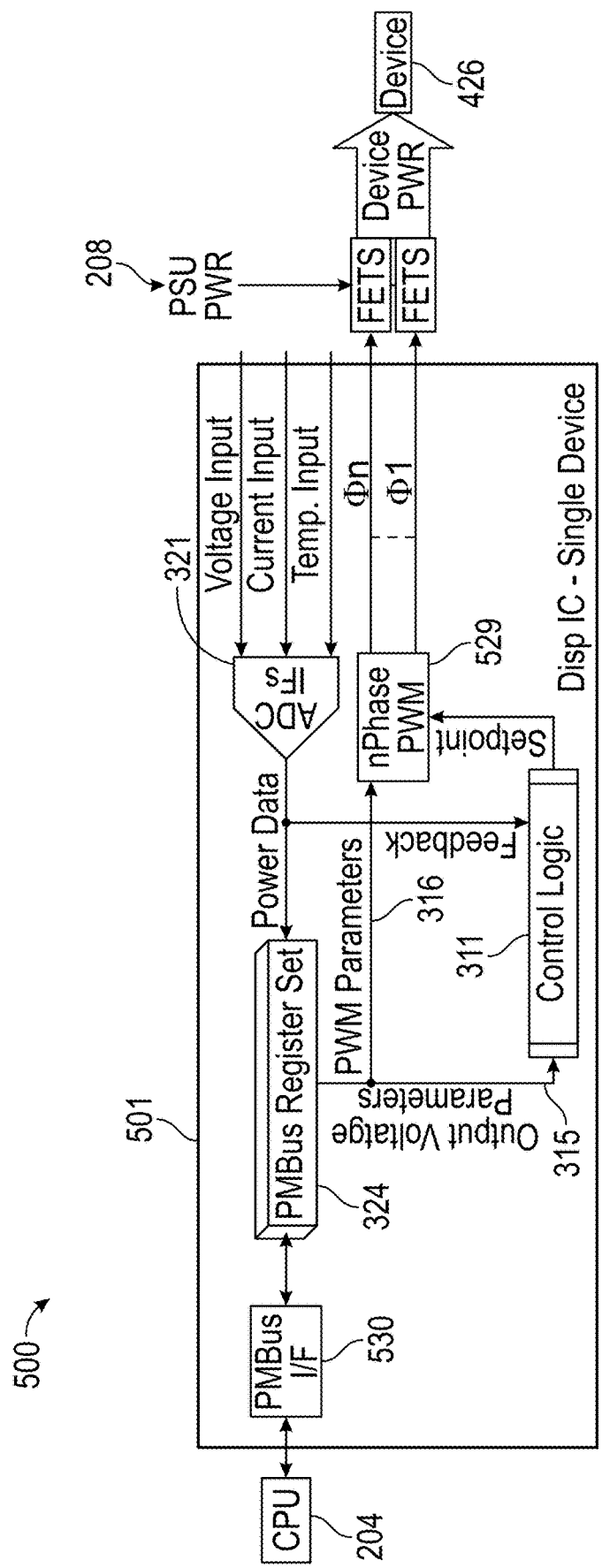

FIG. 5 illustrates a block diagram 500 of an intelligent VRM architecture for the single component 426. The block diagram 500 can be an implementation of the intelligent VRM architecture of FIG. 4, and the intelligent VRM 501 in FIG. 4 can be similar to the intelligent VRM 401. The block diagram 500 can be similar to that illustrated in FIG. 3 with the exception that the intelligent VRM 501 regulates output power for the single component 426. The intelligent VRM 501 can include a PWM controller 529 that provides N PWM phases (or a different number of phases or N+M or different number of phases or N+M or different number of phases) to the high-side and low-side drivers 208 for regulating the output power for the component 426. The intelligent VRM 501 can communicate with the CPU 204 through an internal PMBus interface 530. In some cases, a base address of the PMBus interface can be selectable, for instance, by input pins. For example, input pins can be physical pins on the integrated circuit that embodies the intelligent VRM 501 (such as, an ASIC or FPGA). Depending on user configuration, the input pins can be connected to dip switches. Selecting the base address can advantageously increase expandability with multiple PMBus devices, including other single-device intelligent VRMs.

Figure 6:
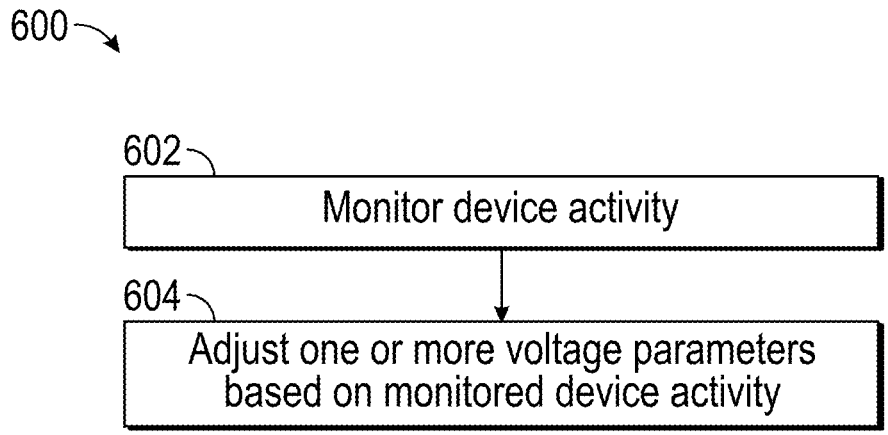
FIGS. 6 and 7 illustrate processes for regulating output power with an intelligent VRM.

FIG. 6 illustrates a process 600 of regulating power with an intelligent VRM. The process 600 can be implemented by any of the intelligent VRMs described herein, such as any of the intelligent VRMs 104, 201, 301, 401, or 501. In block 602, the process 600 can monitor activity (or an activity level) of a component (or multiple components) whose power is being regulated. In block 604, the process 600 can adjust one or more output power parameters (such as, voltage parameters) based on the activity level. As described herein, for instance, the output power can be increased in response to determining that the activity level of the component has increased or in response to a prediction that the activity level of the component will likely increase. The output power can be increased by one or more of increasing the duty cycle of a PWM pulse wave or shortening the period of the pulse wave. As another example, the output power can be decreased in response to determining that the activity level of the component has decreased or in response to a prediction that that the activity level of the component will likely decrease. As described herein, such determinations or predictions can be made by executing one or more ML models.

Figure 7:
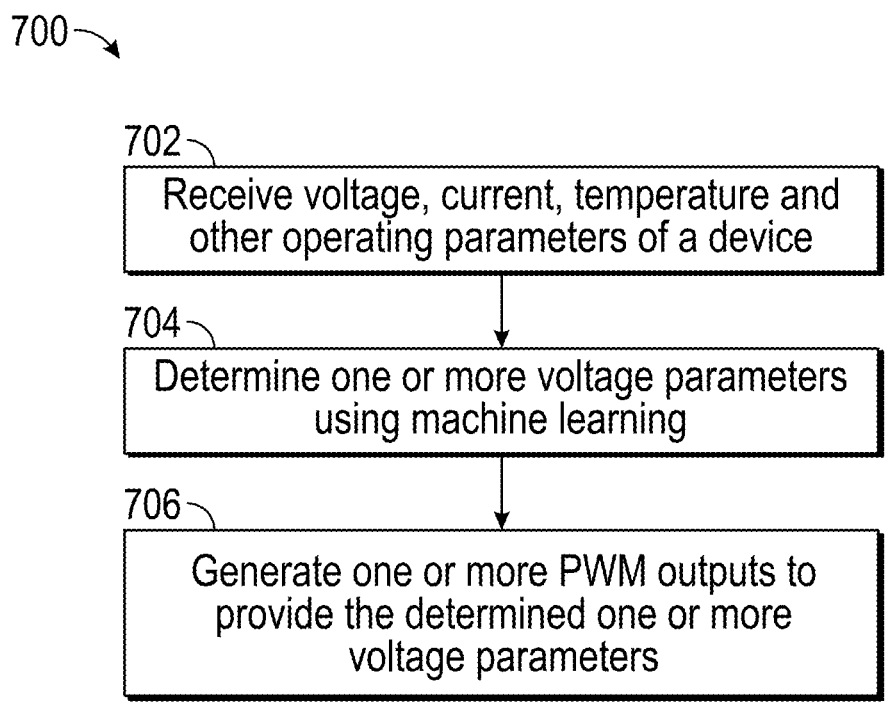

FIG. 7 illustrates a process 700 of regulating power with an intelligent VRM. The process 700 can be implemented by any of the intelligent VRMs described herein, such as any of the intelligent VRMs 104, 201, 301, 401, or 501. In block 702, the process 700 can receive status data from a component (or multiple components) whose power is being regulated. Status data can include one or more of voltage, current, temperature, error, or another operating parameter of the component. In block 704, the process 700 can input the status data into one or more ML models to determine one or more output power parameters for the component (such as, one or more output voltage parameters). In block 706, the process 700 can generate a single phase or multiphase PWM signals to regulate the output power in accordance with the one or more output power parameters.

Additional Examples

1. A system configured regulate power in a computing system, the system comprising electronic circuitry configured to:
   communicate with first and second components of the computing system on a single power management bus (PMBus), the PMBus branching out to the first and second components having individual addresses for communicating on the PMBus;
   monitor a first power consumption of the first component and a second power consumption of the second component;
   determine a first adjustment of a power supplied by a power supply based on the first power consumption and supply the power adjusted by the first adjustment to the first component; and
   determine a second adjustment of the power supplied by the power supply based on the second power consumption and supply the power adjusted by the second adjustment to the second component, the first and second adjustments optimizing power efficiency of the computing system.

2. The system of any of the preceding examples and/or any of the other examples disclosed herein, wherein the electronic circuitry is configured to override one or more instructions from a host device of the PMBus, the one or more instructions directing adjustment of the power supplied to at least one of the first or second components.

3. The system of any of the preceding examples and/or any of the other examples disclosed herein, wherein the electronic circuitry is configured to determine at least one of the first or second adjustments by executing a machine learning (ML) model that analyzes the first or second power consumption and predicts future power consumption of the first or second component.

4. The system of any of the preceding examples and/or any of the other examples disclosed herein, wherein at least one of the first adjustment or the second adjustment comprises an adjustment of a parameter of at least one pulse width modulation (PWM) signal configured to regulate supply of power to the first or second component.

5. The system of example 4, wherein the at least one PWM signal comprises a plurality of PWM signals with different phases.

6. The system of any of the preceding examples and/or any of the other examples disclosed herein, wherein the electronic circuitry is configured to monitor the first power consumption of the first component based on a first status information received from the first component over the PMBus and monitor the second power consumption of the second component based on a second status information received from the second component over the PMBus.

7. The system of any of the preceding examples and/or any of the other examples disclosed herein, wherein the electronic circuitry is configured to:
   monitor the first power consumption of the first component based on monitoring activity of the first component; and
   monitor the second power consumption of the second component based on monitoring activity of the second component.

8. The system of any of the preceding examples and/or any of the other examples disclosed herein, wherein adjusting power supplied by the power supply based on the first and second power consumption comprises stepping down a voltage supplied by the power supply.

9. The system of any of the preceding examples and/or any of the other examples disclosed herein, wherein the electronic circuitry is implemented on an integrated circuit (IC).

10. A computing system comprising the system configured to regulate power of any of the preceding examples and/or any of the other examples disclosed herein and the first and second components of any of the preceding examples and/or any of the other examples disclosed herein.

11. A system configured regulate power in a computing system, the system comprising electronic circuitry configured to:
    communicate with a component of the computing system on a common power management bus (PMBus), the PMBus connected to the component and at least one other component of the computing system, the component and the at least one other component having separate addresses for communicating on the PMBus;
    monitor a power consumption of the component; and
    determine an adjustment of a power supplied by a power supply based on the power consumption and supply the power adjusted by the adjustment to the component thereby optimizing power efficiency of the computing system.

12. The system of example 11 and/or any of the other examples disclosed herein, wherein the electronic circuitry is configured to override one or more instructions from a host device of the PMBus, the one or more instructions directing adjustment of the power supplied to the component.

13. The system of any of examples 11 to 12 and/or any of the other examples disclosed herein, wherein the electronic circuitry is configured to determine the adjustment by executing a machine learning (ML) model that analyzes the power consumption and predicts future power consumption of the component.

14. The system of any of examples 11 to 13 and/or any of the other examples disclosed herein, wherein the adjustment comprises an adjustment of a parameter of at least one pulse width modulation (PWM) signal configured to regulate supply of power to the component.

15. The system of example 14, wherein the at least one PWM signal comprises a plurality of PWM signals with different phases.

16. The system of any of examples 11 to 15 and/or any of the other examples disclosed herein, wherein the electronic circuitry is configured to monitor the power consumption of the component based on monitoring activity of the component.

17. The system of any of examples 11 to 16 and/or any of the other examples disclosed herein, wherein adjusting power supplied by the power supply based on the power consumption comprises stepping down a voltage supplied by the power supply.

18. The system of any of examples 11 to 17 and/or any of the other examples disclosed herein, wherein the electronic circuitry is implemented on an integrated circuit (IC).

19. A computing system comprising the system configured to regulate power of any of examples 11 to 18 and/or any of the other examples disclosed herein, the component of any of examples 11 to 18 and/or any of the other examples disclosed herein, and the at least one other component of any of examples 11 to 18 and/or any of the other examples disclosed herein.

20. An integrated circuit configured to:
communicate with a plurality of devices;
monitor a usage or activity of the plurality of devices; and
alter a state of one of more of the plurality of devices based on the usage or activity.

21. The integrated circuit of example 20 and/or any of the other examples disclosed herein, wherein altering the state of the one of more of the plurality of devices comprises adjusting power supplied to at least two of the plurality of devices.

22. The integrated circuit of any of examples 20 to 21 and/or any of the other examples disclosed herein configured to communicate with the plurality of devices on a common bus connecting the integrated circuit with the plurality of devices.

23. The integrated circuit of example 22 and/or any of the other examples disclosed herein further configured to receive and process one or more commands transmitted on the common bus by a host device of the common bus to at least two devices of the plurality of devices, the at least two devices having separate addresses for communicating on the common bus.

24. The integrated circuit of example 23 and/or any of the other examples disclosed herein further configured to override one or more instructions from the host device for altering the state of the one of more of the plurality of devices.

25. An integrated circuit comprising:
a power monitoring and control system configured to be in communication with a plurality of devices, the power monitoring and control system configured to:
monitor an activity level of at least one of the plurality of devices; and
based on the activity level, adjust power provided to the at least one of the plurality of devices.

26. The integrated circuit of example 25 and/or any of the other examples disclosed herein, wherein the power monitoring and control system is configured to adjust power provided to at least two of the plurality of devices.

27. The integrated circuit of any of examples 25 to 26 and/or any of the other examples disclosed herein, wherein the power monitoring and control system is configured to communicate with the plurality of devices on a common bus connecting the power monitoring and control system with the plurality of devices.

28. The integrated circuit of example 27 and/or any of the other examples disclosed herein, wherein the power monitoring and control system is further configured to receive and process one or more commands transmitted on the common bus by a host device of the common bus to at least two devices of the plurality of devices, the at least two devices having separate addresses for communicating on the common bus.

29. The integrated circuit of example 28 and/or any of the other examples disclosed herein, wherein the power monitoring and control system is further configured to override one or more instructions from the host device for adjusting power provided to the at least one of the plurality of devices.

30. The integrated circuit of any of examples 25 to 30 and/or any of the other examples disclosed herein, wherein the power monitoring and control system comprises a voltage regulator module.

31. A computing system comprising:
a plurality of devices;
a power monitoring and control system in communication with the plurality of devices, the power monitoring and control system configured to:
monitor activity of at least one of the plurality of devices; and
adjust driving voltage or power provided to the at least one of the plurality of devices.

32. The system of example 31 and/or any of the other examples disclosed herein, wherein the power monitoring and control system is configured to override/bypass any other controller controlling the at least one of the plurality of devices.

33. A method of regulating power in a computing system, the method comprising, by an electronic circuitry:
communicating with first and second components of the computing system on a single power management bus (PMBus), the PMBus branching out to the first and second components having individual addresses for communicating on the PMBus;
monitoring a first power consumption of the first component and a second power consumption of the second component;
determining a first adjustment of a power supplied by a power supply based on the first power consumption and supplying the power adjusted by the first adjustment to the first component; and
determining a second adjustment of the power supplied by the power supply based on the second power consumption and supplying the power adjusted by the second adjustment to the second component, the first and second adjustments optimizing power efficiency of the computing system.

34. The method of example 33 and/or any of the other examples disclosed herein, further comprising overriding one or more instructions from a host device of the PMBus, the one or more instructions directing adjustment of the power supplied to at least one of the first or second components.

35. The method of any of examples 33 to 34 and/or any of the other examples disclosed herein, wherein determining at least one of the first or second adjustments is performed by executing a machine learning (ML) model that analyzes the first or second power consumption and predicts future power consumption of the first or second component.

36. The method of any of examples 33 to 35 and/or any of the other examples disclosed herein, wherein at least one of the first adjustment or the second adjustment comprises an adjustment of a parameter of at least one pulse width modulation (PWM) signal configured to regulate supply of power to the first or second component.

37. The method of example 36, wherein the at least one PWM signal comprises a plurality of PWM signals with different phases.

38. The method of any of examples 33 to 37 and/or any of the other examples disclosed herein, wherein monitoring the first power consumption of the first component is performed based on a first status information received from the first component over the PMBus and monitoring the second power consumption of the second component is performed based on a second status information received from the second component over the PMBus.

39. The method of any of examples 33 to 38 and/or any of the other examples disclosed herein, wherein:
monitoring the first power consumption of the first component is based on monitoring activity of the first component; and
monitoring the second power consumption of the second component is based on monitoring activity of the second component.

40. The method of any of examples 33 to 39 and/or any of the other examples disclosed herein, wherein adjusting power supplied by the power supply based on the first and second power consumption comprises stepping down a voltage supplied by the power supply.

41. A non-transitory computer readable medium storing instructions that, when executed by an electronic processing circuitry, cause the circuitry to perform a method of regulating power in a computing system, the method comprising:
communicating with first and second components of the computing system on a single power management bus (PMBus), the PMBus branching out to the first and second components having individual addresses for communicating on the PMBus;
monitoring a first power consumption of the first component and a second power consumption of the second component;
determining a first adjustment of a power supplied by a power supply based on the first power consumption and supplying the power adjusted by the first adjustment to the first component; and
determining a second adjustment of the power supplied by the power supply based on the second power consumption and supplying the power adjusted by the second adjustment to the second component, the first and second adjustments optimizing power efficiency of the computing system.

42. The medium of example 41 and/or any of the other examples disclosed herein, wherein the method further comprises overriding one or more instructions from a host device of the PMBus, the one or more instructions directing adjustment of the power supplied to at least one of the first or second components.

43. The medium of any of examples 41 to 42 and/or any of the other examples disclosed herein, wherein determining at least one of the first or second adjustments is performed by executing a machine learning (ML) model that analyzes the first or second power consumption and predicts future power consumption of the first or second component.

44. The medium of any of examples 41 to 43 and/or any of the other examples disclosed herein, wherein at least one of the first adjustment or the second adjustment comprises an adjustment of a parameter of at least one pulse width modulation (PWM) signal configured to regulate supply of power to the first or second component.

45. The medium of example 44, wherein the at least one PWM signal comprises a plurality of PWM signals with different phases.

46. The medium of any of examples 41 to 45 and/or any of the other examples disclosed herein, wherein monitoring the first power consumption of the first component is performed based on a first status information received from the first component over the PMBus and monitoring the second power consumption of the second component is performed based on a second status information received from the second component over the PMBus.

47. The medium of any of examples 41 to 46 and/or any of the other examples disclosed herein, wherein:
monitoring the first power consumption of the first component is based on monitoring activity of the first component; and
monitoring the second power consumption of the second component is based on monitoring activity of the second component.

48. The medium of any of examples 41 to 47 and/or any of the other examples disclosed herein, wherein adjusting power supplied by the power supply based on the first and second power consumption comprises stepping down a voltage supplied by the power supply.

49. A method of regulating power in a computing system, the method comprising, by an electronic circuitry:
communicating with a component of the computing system on a common power management bus (PMBus), the PMBus connected to the component and at least one other component of the computing system, the component and the at least one other component having separate addresses for communicating on the PMBus;
monitoring a power consumption of the component; and
determining an adjustment of a power supplied by a power supply based on the power consumption and supplying the power adjusted by the adjustment to the component thereby optimizing power efficiency of the computing system.

50. The method of example 49 and/or any of the other examples disclosed herein, further comprising overriding one or more instructions from a host device of the PMBus, the one or more instructions directing adjustment of the power supplied to the component.

51. The method of any of examples 49 to 50 and/or any of the other examples disclosed herein, wherein determining the adjustment is performed by executing a machine learning (ML) model that analyzes the power consumption and predicts future power consumption of the component.

52. The method of any of examples 49 to 51 and/or any of the other examples disclosed herein, wherein the adjustment comprises an adjustment of a parameter of at least one pulse width modulation (PWM) signal configured to regulate supply of power to the component.

53. The method of example 52 and/or any of the other examples disclosed herein, wherein the at least one PWM signal comprises a plurality of PWM signals with different phases.

54. The method of any of examples 49 to 53 and/or any of the other examples disclosed herein, wherein monitoring the power consumption of the component is based on monitoring activity of the component.

55. The method of any of examples 49 to 54 and/or any of the other examples disclosed herein, wherein adjusting power supplied by the power supply is based on the power consumption comprises stepping down a voltage supplied by the power supply.

56. A non-transitory computer readable medium storing instructions that, when executed by an electronic processing circuitry, cause the circuitry to perform a method of regulating power in a computing system, the method comprising:
communicating with a component of the computing system on a common power management bus (PMBus), the PMBus connected to the component and at least one other component of the computing system, the component and the at least one other component having separate addresses for communicating on the PMBus;

monitoring a power consumption of the component; and
determining an adjustment of a power supplied by a power supply based on the power consumption and supplying the power adjusted by the adjustment to the component thereby optimizing power efficiency of the computing system.

57. The medium of example 56 and/or any of the other examples disclosed herein, wherein the method further comprises overriding one or more instructions from a host device of the PMBus, the one or more instructions directing adjustment of the power supplied to the component.

58. The medium of any of examples 56 to 57 and/or any of the other examples disclosed herein, wherein determining the adjustment is performed by executing a machine learning (ML) model that analyzes the power consumption and predicts future power consumption of the component.

59. The medium of any of examples 56 to 58 and/or any of the other examples disclosed herein, wherein the adjustment comprises an adjustment of a parameter of at least one pulse width modulation (PWM) signal configured to regulate supply of power to the component.

60. The medium of example 59 and/or any of the other examples disclosed herein, wherein the at least one PWM signal comprises a plurality of PWM signals with different phases.

61. The medium of any of examples 56 to 60 and/or any of the other examples disclosed herein, wherein monitoring the power consumption of the component is based on monitoring activity of the component.

62. The medium of any of examples 56 to 61 and/or any of the other examples disclosed herein, wherein adjusting power supplied by the power supply is based on the power consumption comprises stepping down a voltage supplied by the power supply.

63. A method of regulating power comprising:
communicating with a plurality of devices;
monitoring a usage or activity of the plurality of devices; and
altering a state of one of more of the plurality of devices based on the usage or activity.

64. The method of example 63 and/or any of the other examples disclosed herein, wherein altering the state of the one of more of the plurality of devices comprises adjusting power supplied to at least two of the plurality of devices.

65. The method of any of examples 63 to 64 and/or any of the other examples disclosed herein comprising communicating with the plurality of devices on a common bus connecting the plurality of devices.

66. The method of example 65 and/or any of the other examples disclosed herein further comprising receiving and processing one or more commands transmitted on the common bus by a host device of the common bus to at least two devices of the plurality of devices, the at least two devices having separate addresses for communicating on the common bus.

67. The method of example 66 and/or any of the other examples disclosed herein further comprising overriding one or more instructions from the host device for altering the state of the one of more of the plurality of devices.

68. A non-transitory computer readable medium storing instructions that, when executed by an electronic processing circuitry, cause the circuitry to perform a method of regulating power in a computing system, the method comprising:
communicating with a plurality of devices;
monitoring a usage or activity of the plurality of devices; and
altering a state of one of more of the plurality of devices based on the usage or activity.

69. The medium of example 68 and/or any of the other examples disclosed herein, wherein altering the state of the one of more of the plurality of devices comprises adjusting power supplied to at least two of the plurality of devices.

70. The medium of any of examples 68 to 69 and/or any of the other examples disclosed herein, wherein the method comprises communicating with the plurality of devices on a common bus connecting the plurality of devices.

71. The medium of example 70 and/or any of the other examples disclosed herein, wherein the method further comprises receiving and processing one or more commands transmitted on the common bus by a host device of the common bus to at least two devices of the plurality of devices, the at least two devices having separate addresses for communicating on the common bus.

72. The medium of example 71 and/or any of the other examples disclosed herein, wherein the method further comprises overriding one or more instructions from the host device for altering the state of the one of more of the plurality of devices.

73. A method of regulating power by a power monitoring and control system configured to be in communication with a plurality of devices, the method comprising:
monitoring an activity level of at least one of the plurality of devices; and
based on the activity level, adjusting power provided to the at least one of the plurality of devices.

74. The method of example 73 and/or any of the other examples disclosed herein, further comprising adjusting power provided to at least two of the plurality of devices.

75. The method of any of examples 73 to 74 and/or any of the other examples disclosed herein, further comprising communicating with the plurality of devices on a common bus connecting the power monitoring and control system with the plurality of devices.

76. The method of example 75 and/or any of the other examples disclosed herein, further comprising receiving and processing one or more commands transmitted on the common bus by a host device of the common bus to at least two devices of the plurality of devices, the at least two devices having separate addresses for communicating on the common bus.

77. The method of example 76 and/or any of the other examples disclosed herein further comprising to overriding one or more instructions from the host device for adjusting power provided to the at least one of the plurality of devices.

78. The method of any of examples 73 to 77 and/or any of the other examples disclosed herein, wherein the power monitoring and control system comprises a voltage regulator module.

79. A non-transitory computer readable medium storing instructions that, when executed by an electronic processing circuitry of a power monitoring and control system configured to be in communication with a plurality of devices, cause the circuitry to perform a method of regulating power in a computing system, the method comprising:
monitoring an activity level of at least one of the plurality of devices; and
based on the activity level, adjusting power provided to the at least one of the plurality of devices.

80. The medium of example 79 and/or any of the other examples disclosed herein, wherein the method further comprises adjusting power provided to at least two of the plurality of devices.

81. The medium of any of examples 79 to 80 and/or any of the other examples disclosed herein, wherein the method further comprises communicating with the plurality of devices on a common bus connecting the power monitoring and control system with the plurality of devices.

82. The medium of example 81 and/or any of the other examples disclosed herein, wherein the method further comprises receiving and processing one or more commands transmitted on the common bus by a host device of the common bus to at least two devices of the plurality of devices, the at least two devices having separate addresses for communicating on the common bus.

83. The medium of example 82 and/or any of the other examples disclosed herein, wherein the method further comprises to overriding one or more instructions from the host device for adjusting power provided to the at least one of the plurality of devices.

84. The medium of any of examples 79 to 83 and/or any of the other examples disclosed herein, wherein the power monitoring and control system comprises a voltage regulator module.

85. A method of regulating power in computing system comprising a plurality of devices, the method comprising:
   by a power monitoring and control system in communication with the plurality of devices:
      monitoring activity of at least one of the plurality of devices; and
      adjusting driving voltage or power provided to the at least one of the plurality of devices.

86. The method of example 85 and/or any of the other examples disclosed herein, further comprising to overriding/bypassing any other controller controlling the at least one of the plurality of devices.

87. A non-transitory computer readable medium storing instructions that, when executed by an electronic processing circuitry of a power monitoring and control system configured to be in communication with a plurality of devices of a computing system, cause the circuitry to perform a method of regulating power in the computing system, the method comprising:
   monitoring activity of at least one of the plurality of devices; and
   adjusting driving voltage or power provided to the at least one of the plurality of devices.

88. The medium of example 87 and/or any of the other examples disclosed herein, wherein the method further comprises to overriding/bypassing any other controller controlling the at least one of the plurality of devices.

Other Variations

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability of hardware and software, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electronic circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the methods described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a controller or processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An example storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

The various components illustrated in the figures or described herein may be implemented as software or firmware on a processor, controller, ASIC, FPGA, or dedicated hardware. The software or firmware can include instructions stored in a non-transitory computer-readable memory. The instructions can be executed by a processor, controller, ASIC, FPGA, or dedicated hardware. Hardware components, such as controllers, processors, ASICs, FPGAs, and the like, can include logic circuitry. Furthermore, the features and attributes of the specific embodiments disclosed above may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system configured regulate power in a computing system, the system comprising electronic circuitry configured to:

communicate with first and second components of the computing system on a single power management bus (PMBus), the PMBus branching out to the first and second components having individual addresses for communicating on the PMBus;

monitor one or more instructions from a host device of the PMBus, the one or more instructions directing a first adjustment of the power supplied to the first component and a second adjustment of power supplied to the second component;

monitor a first power consumption of the first component and a second power consumption of the second component;

determine a third adjustment of a power supplied by a power supply based on the first power consumption and supply the power adjusted by the third adjustment to the first component, the third adjustment of power being different than the first adjustment of power; and determine a fourth adjustment of the power supplied by the power supply based on the second power consumption and supply the power adjusted by the fourth adjustment to the second component, the fourth adjustment of power being different than the second adjustment of power, the third and fourth adjustments overriding the one or more instructions from the host device and optimizing power efficiency of the computing system, wherein at least one of the third adjustment or the fourth adjustment comprises an adjustment of a parameter of at least one pulse width modulation (PWM) signal from a plurality of PWM signals with different phases, the plurality of PWM signals configured to regulate supply of power to the first or second component.

2. The system of claim 1, wherein the electronic circuitry is configured to determine at least one of the third or fourth adjustments by executing a machine learning (ML) model that analyzes the first or second power consumption and predicts future power consumption of the first or second component.

3. The system of claim 1, wherein the electronic circuitry is configured to monitor the first power consumption of the first component based on a first status information received from the first component over the PMBus and monitor the second power consumption of the second component based on a second status information received from the second component over the PMBus.

4. The system of claim 1, wherein the electronic circuitry is configured to:

monitor the first power consumption of the first component based on monitoring activity of the first component; and monitor the second power consumption of the second component based on monitoring activity of the second component.

5. The system of claim 1, wherein the second or third adjustment comprises stepping down a voltage supplied by the power supply.

6. The system of claim 1, wherein the electronic circuitry is implemented on an integrated circuit (IC).

7. A computing system comprising the system configured to regulate power of claim 1 and the first and second components of claim 1.

8. The system of claim 1, wherein the host device comprises a central processing unit (CPU) and the electronic circuitry is separate from the CPU.

9. The system of claim 8, wherein the electronic circuitry is part of a voltage regulation module that is separate from the CPU.

10. The system of claim 1, wherein the host device comprises a field programmable gate array (FPGA) and the electronic circuitry is separate from the FPGA.

11. The system of claim 10, wherein the electronic circuitry is part of a voltage regulation module that is separate from the FPGA.

12. A system configured regulate power in a computing system, the system comprising electronic circuitry configured to:
   communicate with a component of the computing system on a common power management bus (PMBus), the PMBus connected to the component and at least one other component of the computing system, the component and the at least one other component having separate addresses for communicating on the PMBus;
   monitor one or more instructions from a host device of the PMBus, the one or more instructions directing a first adjustment of the power supplied to the component;
   monitor a power consumption of the component;
   determine a second adjustment of a power supplied by a power supply based on the power consumption, the second adjustment of power being different than the first adjustment of power; and
   supply the power adjusted by the second adjustment to the component and override the one or more instructions from the host device, thereby optimizing power efficiency of the computing system,
   wherein the second adjustment comprises an adjustment of a parameter of at least one pulse width modulation (PWM) signal from a plurality of PWM signals with different phases, the plurality of PWM signals configured to regulate supply of power to the component.

13. The system of claim 12, wherein the electronic circuitry is configured to determine the second adjustment by executing a machine learning (ML) model that analyzes the power consumption and predicts future power consumption of the component.

14. The system of claim 12, wherein the electronic circuitry is configured to monitor the power consumption of the component based on monitoring activity of the component.

15. The system of claim 12, wherein the second adjustment comprises stepping down a voltage supplied by the power supply.

16. The system of claim 12, wherein the electronic circuitry is implemented on an integrated circuit (IC).

17. A computing system comprising the system configured to regulate power of claim 12, the component of claim 12, and the at least one other component of claim 12.

18. The system of claim 12, wherein the host device comprises a central processing unit (CPU) and the electronic circuitry is separate from the CPU.

19. The system of claim 18, wherein the electronic circuitry is part of a voltage regulation module that is separate from the CPU.

20. The system of claim 12, wherein the host device comprises a field programmable gate array (FPGA) and the electronic circuitry is separate from the FPGA.

21. The system of claim 20, wherein the electronic circuitry is part of a voltage regulation module that is separate from the FPGA.

* * * * *